350-406 SR

XR 3,728,644

United States Patent [11] 3,728,644

Chu [45] Apr. 17, 1973

[54] POLARIZATION TRANSFORMATION APPARATUS

[75] Inventor: Ta-Shing Chu, Lincroft, N.J.

[73] Assignee: Bell Telephone Laboratories, Incorporated, Murray Hill, Berkeley Heights, N.J.

[22] Filed: Nov. 1, 1971

[21] Appl. No.: 194,436

[52] U.S. Cl. ..............333/21 A, 333/31 A, 333/81 A
[51] Int. Cl. ............................H01p 1/16, H01p 1/18
[58] Field of Search ..........................333/21, 21 A, 1, 333/6, 3 A, 31 R, 81 A

[56] References Cited

UNITED STATES PATENTS 2,948,865 8/1960 Smith ..................................333/21
3,031,661 4/1962 Moeller et al. ..................333/21 R X
3,215,957 11/1965 Dantzig et al. ......................333/21 R

*Primary Examiner*—Herman Karl Saalbach
*Assistant Examiner*—Marvin Nussbaum
*Attorney*—R. J. Guenther et al.

[57] ABSTRACT

Apparatus for transforming two elliptically polarized waves into two oppositely rotating circularly polarized waves. The two elliptically polarized waves are first transformed by a phase-shifter into two other oppositely rotating elliptically polarized waves having parallel major and minor axes and equal axial ratios. Attenuation equal to the reciprocal of the axial ratio is then applied to both the transformed elliptical waves thereby simultaneously converting the oppositely rotating elliptical waves into two oppositely rotating circular waves.

7 Claims, 1 Drawing Figure

3728644
OR IN 333/21A

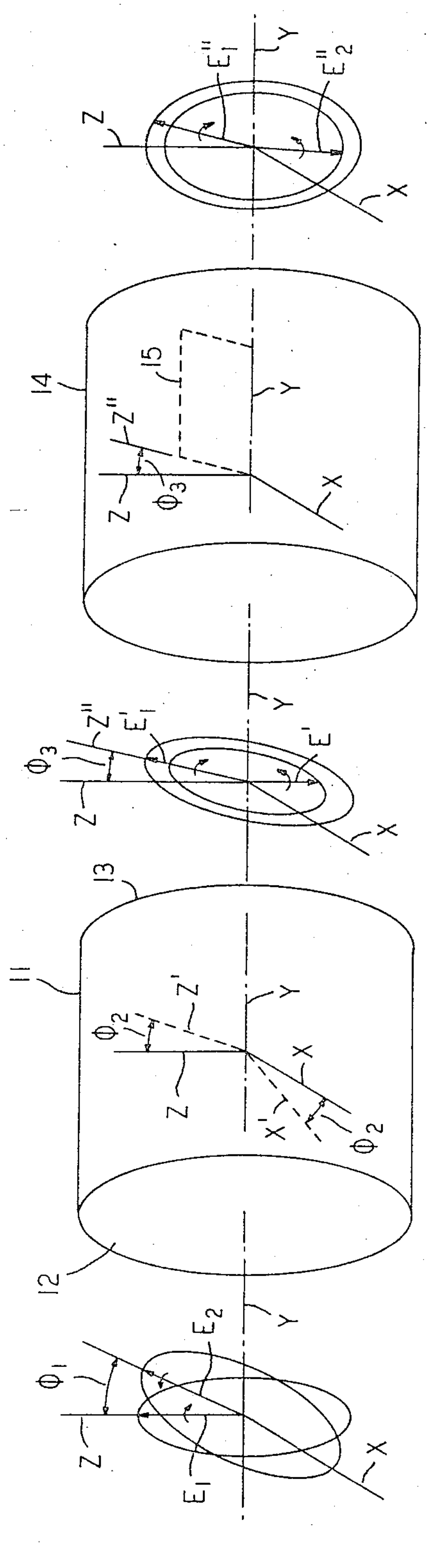
11
12
13
14
15
X
Y
Z
Z'
Z"
X'
E1
E2
E'1
E'
E"1
E"2
Φ1
Φ2
Φ3

POLARIZATION TRANSFORMATION APPARATUS

BACKGROUND OF THE INVENTION

This invention relates to microwave polarization apparatus and, in particular, to apparatus for converting two elliptically polarized waves into two oppositely rotating circularly polarized waves.

In copending application Ser. No. 194,361, filed on the same date herewith, there is disclosed an arrangement for transforming two elliptically polarized waves into two oppositely rotating circularly polarized waves. In the aforesaid transformation arrangement, the elliptical waves are first converted into two orthogonal linearly polarized waves by a first phase-shifter and an attenuator. The orthogonal waves are then transformed into two circular waves by a second phase-shifter. Thus, the arrangement requires two phase-shifters. Moreover, in situations where the elliptical waves to be transformed are broad, i.e., where the magnitude of the ratio of minor to major axes of these waves is close to 1, the amount of phase shift required to be provided by the first phase-shifter will be large, i.e., will approach 90°. The latter phase-shifter, therefore, will limit the bandwidth capability of the polarization conversion device, since the larger the amount of phase-shift required, the more difficult it is to provide such phase-shift over a specified frequency band.

It is, therefore, a broad object of the present invention to provide an arrangement for converting two elliptically polarized waves into oppositely rotating circularly polarized waves which requires a reduced amount of phase-shift and fewer phase-shifting elements.

SUMMARY OF THE INVENTION

In accordance with the principles of the present invention, the above and other objectives are accomplished by a transformation arrangement wherein the two elliptically polarized waves are first transformed by a phase-shifter into two other oppositely rotating elliptically polarized waves having parallel major and minor axes and equal axial ratios, i.e., ratios of minor to major axes of equal magnitude. Attentuation equal to the receiprocal of the axial ratio is then applied to both the transformed eliptical waves, thereby simultaneously converting the oppositely rotating elliptical waves into oppositely rotating circular waves.

Transformation of the original elliptical waves into two coincident elliptical waves having equal axial ratios is accomplished by applying a predetermined phase-shift to the components of each one wave lying along at least one of two orthogonal directions. The latter directions are those for which the magnitude of the ratio of the components of the first wave therealong is equal to the magnitude of the ratio of the components of the second wave therealong. Additionally, the amount of phase-shift applied is such as to make the phase of the ratio of the components of the first wave equal to the negative of the phase of the ratio of the components of the second wave.

BRIEF DESCRIPTION OF THE DRAWINGS

A clearer understanding of the above-mentioned objectives and features of the present invention can be obtained by reference to the following detailed description taken in conjunction with the accompanying drawings in which:

FIG. 1 shows an arrangement for transforming two elliptically polarized waves into two oppositely rotating circularly polarized waves in accordance with the principles of the invention.

DETAILED DESCRIPTION

Prior to beginning a discussion of the present invention, a review of certain well-known waveguide principles which are described by G. C. Southworth in his textbook "Principles and Applications of Waveguide Transmission," (1950), will now be presented. As discussed on pages 366–380 and pages 325–335 of the latter text, a circular waveguide can be readily adapted to provide either an attenuation or a phase-shift to waves propagating therein by inserting within the guide a thin, elongated member having appropriate dielectric and attenuating properties. More particularly, the guide will behave primarily as an attenuator if the member is selected to have a relatively high conductivity and a relatively low dielectric constant. Conversely, the guide will function principally as a phase-shifter if the member is selected to have a relatively low conductivity and a relatively high dielectric constant.

In either situation, however, the waveguide can be adapted to affect (i.e., phase-shift or attenuate) only waves of a specific polarization by suitably selecting the relative dimensions and orientation of the inserted member. More specifically, by selecting the member to be thin (i.e., to have a thickness substantially less than its length and width) and inserting it in the guide with its plane (i.e., the plane defined by its length and width dimensions) parallel to a particular radial plane of the waveguide, the guide will affect only waves having a plane of polarization parallel to the particular radial plane.

In the above-described case, the shape of the inserted member takes the form of a thin plate or fin, with the plane of the plate being parallel to the polarization plane of the waves to be attenuated or phase-shifted. The particular degree or extent of phase-shift or attenuation received by the latter waves as a result of such a plate is of course readily controllable (once the dielectric constant and conductivity are chosen) by varying the dimensions (i.e., thickness, width and length) of the plate. Thus, where the plate causes the waveguide to produce an attenuation, any particular value of attenuation can be realized by suitable adjustment of the plate dimensions. Similarly, where the plate causes the guide to behave as a phase-shifter, suitable adjustment of the plate dimensions enables any value of phase-shift to be realized. In both cases, moreover, empirical techniques can be readily employed to arrive at the proper plate dimensions for a particular phase-shift or attenuation.

Having briefly outlined some of the waveguide principles which will be referred to in the discussion to follow, attention is directed to FIG. 1.

FIG. 1 illustrates apparatus for transforming two elliptically polarized waves into two oppositely rotating circularly polarized waves, in accordance with the principles of the present invention. The two elliptically polarized waves to be transformed are depicted in FIG. 1 by the electric field vectors $E_1$ and $E_2$. The elliptical wave $E_1$ is orientated with its major axis parallel to the $z$ direction of reference coordinate system $x, y, z$ and has an axial ratio, which is defined as the magnitude of the ratio of the minor to major axis for clockwise rotating waves and the negative of the latter magnitude for counter-clockwise rotating waves, equal to $A_1$. The elliptical wave $E_2$, on the other hand, is orientated with its major axis rotated clockwise by an amount $\phi_1$ relative to the z axis and has a different axial ratio $A_2$. As shown, both waves are rotating in opposite directions, but, it should be noted, that the principles of the invention are also applicable when the waves are rotating in the same direction.

Waves $E_1$ and $E_2$ are applied to a waveguide section 11, illustrated as having a circular cross section, through an input port 12. Waveguide section 11 is adapted to shift the phase of waves (i.e., delay waves) polarized in a first direction, illustrated as the x' direction, relative to waves polarized in a second orthogonal direction, shown as the z' direction, by an amount $\Delta\phi$. In accordance with the invention, the $x'$ and $z'$ directions are selected to be those directions for which the ratio $r_1$ of the component of the wave $E_1$ in the $x'$ direction $E_{1x'}$ to the component of $E_{1z'}$ in the $z'$ direction $E_{1z}$ and the ratio $r_2$ of the component of $E_2$ in the x' direction $E_{2x'}$ to the component of $E_2$ in the z' direction $E_{2z'}$ are of equal magnitude. These relationships can be expressed as follows:

$$|r_1| = |r_2| \qquad (1)$$

$$r_1 = (E_{1x'})/(E_{1z'}) \qquad (2)$$

$$r_2 = (E_{2x'})/(E_{2z'}) \qquad (3)$$

Moreover, in further accord with the invention, the amount of phase-shift $\Delta\phi$ provided by waveguide section 11 is selected such that the resultant phases of the components $E_{1x'}$ and $E_{2x'}$, after the components have passed through the section, are such that the phase angles of the ratios $r_1$ and $r_2$ are the negative of one another. The aforesaid relationship can be expressed in equation form as $$\underline{/r_1} - \Delta\phi = -(\underline{/r_2} - \Delta\phi) \qquad (4)$$

With the $x'$ and $z'$ directions and the phase-shift $\Delta\phi$ chosen, as above-described, it can be shown that waveguide section 11 transforms the two elliptical waves $E_1$ and $E_2$ into two other oppositely rotating elliptically polarized waves $E_1'$ and $E_2'$ having parallel major axes and parallel minor axes and equal axial ratios. The waves $E_1'$ and $E_2'$ are shown in FIG. 1, exiting from waveguide 11, via output port 13. The wave $E_1'$ exits rotating in a clockwise sense, while $E_2'$ exits rotating in a counterclockwise sense. Both waves have their major axes orientated at an angle $\phi_3$ relative to the $z$ direction (i.e., along the $z''$ direction) and both waves have axial ratios equal to A.

It should be noted that waveguide section 11 can be adapted to provide the required phase-shift $\Delta\phi$ in the x' polarization direction in any well-known conventional manner.

Thus, such adaptation might take the form described in the portions of the Southworth textbook "Principles and Applications of Waveguide Transmission," discussed above. More specifically, as above-indicated, a thin, elongated dielectric plate having a high dielectric constant and low conductivity might be inserted within guide 11 such that the plane of the plate is parallel to the polarization direction of the waves to be phase-shifted (i.e. parallel to the $x'-y$ plane in the present illustrative case). The guide will thus introduce a phase-shift primarily to the aforesaid waves. The latter phase-shift can then be made equal to the required value $\Delta\phi$ by suitably adjusting the plate dimensions in the manner described in the above discussion.

Upon passage out of waveguide 11, the waves $E_1'$ and $E_2'$ are coupled into another waveguide section 14, also shown as having a circular cross section, which is disposed to receive waves exiting port 13 of waveguide 11. Waveguide section 14 is adapted to provide attenuation of a magnitude equal to the reciprocal of the axial ratio A to waves polarized along the direction $z''$.

Such adaption, as in the previous phase-shift case, might be accomplished in the manner described in the portions of the Southworth textbook discussed above. In particular, a thin, elongated fin or plate (i.e., resistance card 15) having a high conductivity and low dielectric constant can be inserted into the guide such that the plane of the plate is parallel to the z'' polarization direction (i.e., parallel to the $z''-y$ plane). The aforesaid plate will thus cause guide 14 to introduce an attenuation to waves polarized primarily in the $z''$ direction. The latter attenuation can then be made equal to the reciprocal of the axial ratio A by suitably adjusting the plate dimensions, in the manner described in the above discussion.

In traversing waveguide section 14, therefore, the major axis of each of the elliptical waves $E_1'$ and $E_2'$ is reduced by a factor equal to reciprocal of the axial ratio of the waves (i.e., 1/A). As a result, the major and minor axes of each wave are made equal and each of the waves is thereby transformed into a circular wave. Thus, as shown, the two oppositely rotating elliptical waves $E_1'$ and $E_2'$ are converted by waveguide 14 into two oppositely rotating circular waves $E_1''$ and $E_2''$.

Having discussed the operation of transformation apparatus of FIG. 1, certain functional relationships relating the phase-shift $\Delta\phi$, the angle $\phi_2$ (i.e., the angle defining the clockwise rotation of the $x'$ and $2'$ axes relative to the $x$ and $z$ axes, respectively), the angle $\phi_3$ and the axial ratio A to the parameters $A_1$, $A_2$ and $\phi_1$, of the waves $E_1$ and $E_2$ will now be given. It can be shown that the ratios $r_1$ and $r_2$ are given as $$r_1 = [(1-q_1)/(1+q_1)]e^{-j\pi/2} \qquad (5)$$

$$r_2 = [(1-q_2)/(1+q_2)]e^{-j(\pi/2)} \qquad (6)$$

where $$q_1 = [(1+A_1)/(1-A_1)]e^{-j2\phi_2} \qquad (7)$$

and $$q_2 = [(1+A_2)/(1-A_2)]\, e^{-j2(\varphi_2-\varphi_1)} \quad (8)$$

Substituting equations (5), (6), (7), and (8) into equation (1) and simplifying results in $$\varphi_2 = \frac{1}{2}\tan^{-1}\left[\frac{\frac{(1+A_2^2)(1-A_1^2)}{(1+A_1^2)(1-A_2^2)} - \cos 2\varphi_1}{\sin 2\varphi_1}\right] \quad (9)$$

for $$0 < \phi_2 < (\pi)/(2) \quad (10)$$

Also, by combining equations (5), (6), (7), and (8) with equation (4) and simplifying we have $$\Delta\phi = \tfrac{1}{2}[\angle r_1 + \angle r_2] \quad (11)$$

where $$\angle r_1 = \tan^{-1}\left[\frac{2A_1}{(1-A_1^2)\sin 2\phi_2}\right] < \pi \quad (12)$$

for
$0 < r_1 < \pi$ when $A_1 > 0$ and $-\pi/2 < r_1 < \pi/2$ when $\sin 2\phi_2 > 0$ (13)

and $$\angle r_2 = \tan^{-1}\left[\frac{2A_2}{(1-A_2^2)\sin 2(\varphi_2-\varphi_1)}\right] < \pi \quad (14)$$

for
$0 < \angle r_2 > \pi$ when $A_2 > 0$ and $-\pi/2 < \angle r_2 < \pi/2$ when $\sin^2(\phi_2-\phi_1) > 0$ (15)

It can be further shown, that the parameters $\phi_3$ and A are given as $$\phi_3 = \phi_2 - \frac{1}{2}\tan^{-1}\left\{\frac{2|r_1|}{1-|r_1|^2}\cos\frac{1}{2}[\angle r_1 - \angle r_2]\right\} \quad (16)$$

and $$A = \tan \tfrac{1}{2}(\gamma_1+\gamma_2) \quad (17)$$

where $$\gamma_1 = \tan^{-1}\sqrt{\frac{(1+A_1^2)-(1-A_1^2)\cos 2\beta_1}{(1+A_1^2)+(1-A_1^2)\cos 2\beta_1}} \quad (18)$$

$$\gamma_2 = \tan^{-1}\sqrt{\frac{(1+A_2^2)-(1-A_2^2)\cos 2(\beta_1-\phi_1)}{(1+A_2^2)+(1-A_2^2)\cos 2(\beta_1-\phi_1)}}$$

and (19)

$$\beta_1 = \frac{1}{2}\cot^{-1}\left[\frac{\cos 2\phi_1 - \frac{A_2(1-A_1^2)}{A_1(1-A_2^2)}}{\sin 2\phi_1}\right] \quad (20)$$

for $$0 < \beta_1 < \pi/2 \quad (21)$$

By adapting guide 11 to provide a delay in conformity with the relationships given by equations 9 and 11 and guide 14 to provide an attenuation in conformity with the relationships given by equations 16 and 17, the combined arrangement of guides, as shown in FIG. 1, will operate to transform two elliptically polarized waves into two oppositely rotating circular polarized waves, as above-described.

It is to be understood that the embodiments described herein are merely illustrative, and that numerous and varied other arrangements can readily be devised in accordance with the teachings of the present invention by those skilled in the art without departing from the spirit and scope of the invention.

What is claimed is:

1. Apparatus for transforming first and second elliptically polarized waves into first and second oppositely rotating circularly polarized waves comprising:
phase shift means for transforming said first and second elliptically polarized waves into third and fourth elliptically polarized waves having equal axial ratios and parallel major and minor axes;
and attenuation means for applying attenuation to said third and fourth elliptical waves along the direction of said major axes, said attenuation being equal in magnitude to the reciprocal of said axial ratios.

2. Apparatus in accordance with claim 1 wherein said phase-shift means comprises waveguide means adapted to apply a phase-shift along at least one of first and second orthogonal directions, said directions being those for which the magnitude of the ratio of the component of said first elliptical wave along said first direction to the component of said first elliptical wave along said second direction is equal to the magnitude of the ratio of the component of said second elliptical wave along said first direction to the component of said second elliptical wave along said second direction.

3. Apparatus in accordance with claim 2 in which said phase-shift is equal to one-half the sum of the phase angles of said ratios.

4. Apparatus in accordance with claim 2 in which said first direction is rotated clockwise by an angle $\phi_2$ relative to the major axis of said first elliptical wave, where $\phi_2$ is given as $$\phi_2 = \frac{1}{2}\tan^{-1}\left[\frac{\frac{(1+A_2^2)(1-A_1^2)}{(1+A_1^2)(1-A_2^2)} - \cos 2\phi_1}{\sin 2\phi_1}\right]$$

for $$0 < \phi_2 < \pi/2$$

where $A_1$ is the axial ratio of said first elliptical wave, $A_2$ is the axial ratio of said second elliptical wave and $\phi_1$ is the clockwise angle of rotation of the major axes of said second elliptical wave relative to said first elliptical wave.

5. Apparatus in accordance with claim 4 in which said phase-shift means applies a phase-shift $\Delta\phi$, where $\Delta\phi$ is given as $$\Delta\phi = \tfrac{1}{2}[\angle r_1 + \angle r_2]$$

where $$\angle r_1 = \tan^{-1}\left[\frac{2A_1}{(1-A_1^2)\sin 2\phi_2}\right] < \pi$$

for
$0 < \angle r_1 < \pi$ when $A_1 > 0$ and $-\pi/2 < \angle r_1 < \pi 2$ when $\sin 2\phi_2 < 0$,
and $$\angle r_2 = \tan^{-1}\left[\frac{2A_2}{(1-A_2^2)\sin 2(\phi_2-\phi_1)}\right] < \pi$$

for $0 < \angle r_2 < \pi$ when $A_2 > 0$ and $-\pi/2 < \angle r_2 < \pi/2$ when $\sin^2(\phi_2-\phi_1)>0$.

6. Apparatus in accordance with claim 5 in which said attenuation means applies an attenuation $A_r$ along a direction which is rotated clockwise by an angle $\phi_r$ relative to the major axis of said first elliptical wave, where $A_r$ and $\phi_r$ are given by $$A_r\ (\text{in } DB) = 20 \log_{10} \cot \tfrac{1}{2} (\gamma_1 + \gamma_2)$$

where $$\gamma_1 = \tan^{-1} \sqrt{\frac{(1+A_1^2)-(1-A_1^2)\cos 2\beta_1}{(1+A_1^2)+(1-A_1^2)\cos 2\beta_1}}$$

$$\gamma_2 = \tan^{-1} \sqrt{\frac{(1+A_2^2)-(1-A_2^2)\cos 2(\beta_1-\phi_1)}{(1+A_2^2)+(1-A_2^2)\cos 2(\beta_1-\phi_1)}}$$

$$\beta_1 = \frac{1}{2} \cot^{-1} \left[ \frac{\cos 2\phi_1 - \dfrac{A_2(1-A_1^2)}{A_1(1-A_2^2)}}{\sin 2\phi_1} \right]$$

for $$0 < \beta_1 < \pi/2$$

and $$\phi_r = \phi_2 - \frac{1}{2} \tan^{-1} \left\{ \frac{2|r_1|1}{1-|r_1|^2} \cos \frac{1}{2} \left[ \angle r_1 - \angle r_2 \right] \right\}.$$

7. Apparatus for transforming first and second elliptically polarized waves into third and fourth elliptically polarized waves having equal axial ratios and parallel major and minor axes comprising:

an input port into which said first and second elliptically polarized waves are coupled;

an output port out of which said third and fourth elliptically polarized waves are coupled;

and waveguide means connecting said input and output ports, said waveguide means being adapted to shift the phase of waves polarized in a first direction relative to waves polarized in a direction orthogonal to said first direction by an amount equal to one-half the phase angle of a first quantity formed by dividing the component of said first elliptically polarized wave in said first direction by the component of said first elliptically polarized wave in said orthogonal direction plus one-half the phase angle of a second quantity formed by dividing the component of said second elliptically polarized wave in said first direction by the component of said second elliptically polarized wave in said orthogonal direction, said directions being those for which the magnitude of said first quantity is equal to the magnitude of said second quantity.

* * * * *